United States Patent
Browne et al.

(10) Patent No.: US 6,220,652 B1
(45) Date of Patent: Apr. 24, 2001

(54) MOTOR VEHICLE BODY WITH SIDE IMPACT PROTECTION

(75) Inventors: Alan Lampe Browne, Grosse Pointe; Nancy L. Johnson, Northville, both of MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 09/285,984

(22) Filed: Apr. 5, 1999

(51) Int. Cl.[7] .................................................. B60J 5/04
(52) U.S. Cl. ..................... 296/188; 296/189; 296/146.6; 49/502
(58) Field of Search ................... 296/188, 146.6, 296/146.5, 189; 42/502

(56) References Cited

U.S. PATENT DOCUMENTS

| | | |
|---|---|---|
| 3,700,076 | 10/1972 | Forsting et al. ................ 188/1 C |
| 3,868,141 | 2/1975 | Johnson ........................ 296/28 R |
| 3,887,227 | 6/1975 | Deckert ........................ 296/28 R |
| 4,307,911 | 12/1981 | Pavlik ............................ 296/188 |
| 4,434,580 | 3/1984 | Engelsberger et al. ............ 49/502 |
| 4,634,141 * | 1/1987 | Hagan et al. ................... 280/704 |
| 4,886,295 | 12/1989 | Browne .......................... 280/777 |
| 4,915,442 | 4/1990 | Garnweidner .................... 296/188 |
| 4,923,327 * | 5/1990 | Gorlov .............................. 404/6 |
| 4,945,682 | 8/1990 | Altman et al. ..................... 49/502 |
| 5,224,752 | 7/1993 | Marshall ........................ 296/146 |
| 5,431,476 | 7/1995 | Torigaki ......................... 296/188 |
| 5,526,552 * | 6/1996 | De Angelis ...................... 24/136 L |
| 5,799,760 * | 9/1998 | Small ............................. 188/371 |
| 5,895,088 * | 4/1999 | Knott .......................... 296/146.6 X |

FOREIGN PATENT DOCUMENTS

| | | | |
|---|---|---|---|
| 5-294141 | 11/1993 | (JP) | ............... B60J/5/04 |
| 5-294142 | 11/1993 | (JP) | ............... B60J/5/04 |
| 5-294143 | 11/1993 | (JP) | ............... B60J/5/04 |

* cited by examiner

*Primary Examiner*—Joseph D. Pape
(74) *Attorney, Agent, or Firm*—Charles E. Leahy

(57) ABSTRACT

A motor vehicle body including a plurality of vertical pillars defining therebetween a plurality of door frames for access to a passenger compartment of the vehicle body, a plurality of doors supported by pairs of hinges on the front vertical pillar of each door frame for pivotal movement between closed and open positions, and a light weight side impact protection barrier characterized by high elongational stiffness and high strain-at-failure. The light weight barrier may be employed alone or in combination with a horizontal door beam and includes a synthetic cable in the door made from a plurality of helically braided bundles of fibers selected from a group of fibers consisting of aramid fibers and liquid crystal polymer fibers characterized by a strain-at-failure exceeding about 3%. The synthetic cable includes attachments to the front and rear pillars of the door frame when the door is closed. The synthetic cable is very stiff in tension to suppress intrusion into the passenger compartment and has a failure mode characterized by serial or sequential failure of individual ones of the fibers rather than simultaneous failure of all of the fibers.

7 Claims, 3 Drawing Sheets

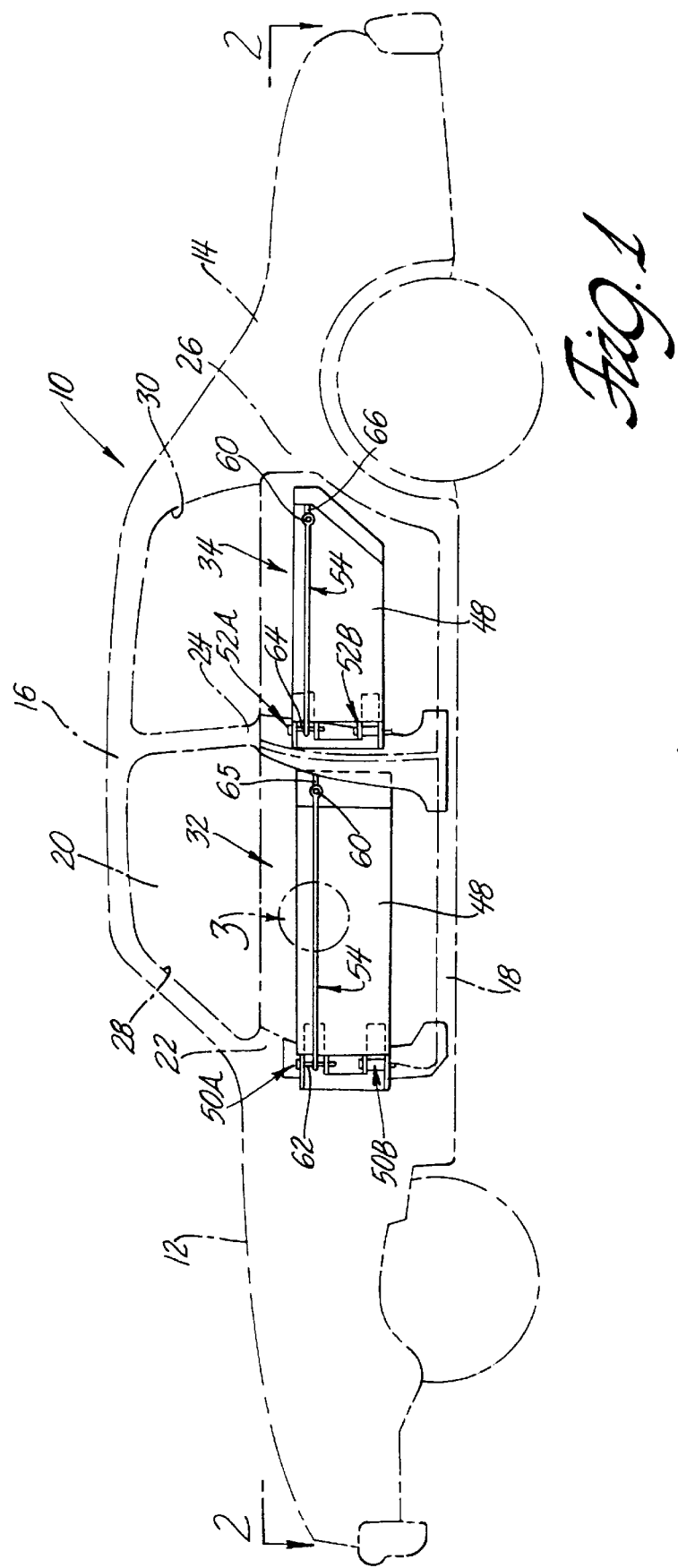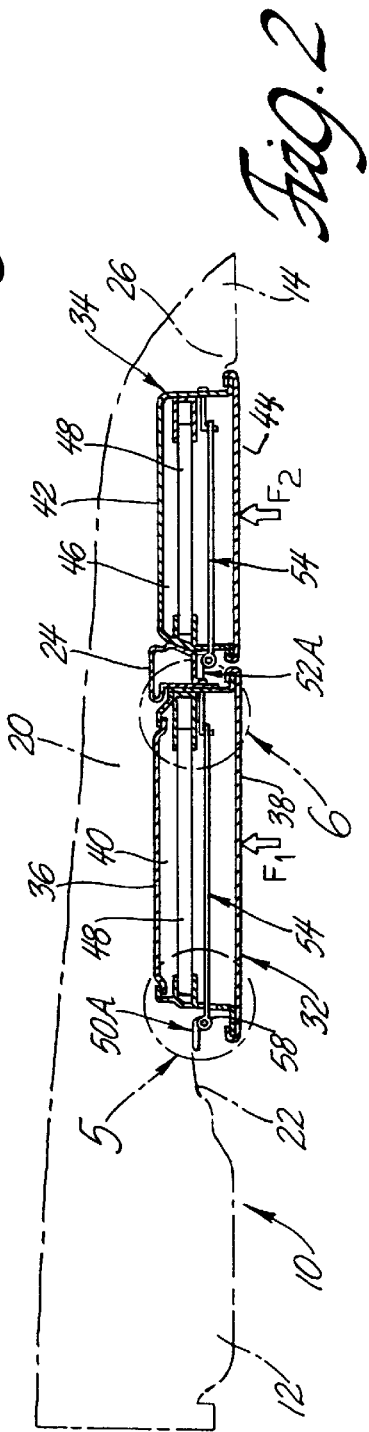

MOTOR VEHICLE BODY WITH SIDE IMPACT PROTECTION

TECHNICAL FIELD

This invention relates to a motor vehicle body having side impact protection.

BACKGROUND OF THE INVENTION

A motor vehicle body typically includes a plurality of vertical pillars between which are defined a plurality of door frames for access to a passenger compartment of the vehicle body. Respective ones of a plurality of doors are supported by hinges on the front vertical pillar of each door frame for pivotal movement between closed positions and open positions. Each door further commonly includes a horizontal steel door beam which spans the corresponding door frame in the closed position of the door and affords side impact protection against intrusion into the passenger compartment of an object, e.g. another motor vehicle, which impacts the vehicle body laterally. Increasing the structural integrity of the door beam by, for example, increasing the gauge of the steel used to make the beam, increases the rigidity of the door beam and its side impact protection but also increases the weight of the motor vehicle which negatively affects fuel economy. Motor vehicle bodies having stiff, light weight door beams made of fiber reinforced composite materials have been proposed but have not been commercially successful because such composite beams exhibit low strain-at-failure, i.e. fail abruptly after only minimal strain. Motor vehicle bodies having metal cables for side impact protection have also been proposed but such cables are also characterized by low strain at failure. A motor vehicle body according to this invention is an improvement over such prior motor vehicle bodies in that it includes a light weight side impact protection barrier characterized by high elongational stiffness and high strain-at-failure.

SUMMARY OF THE INVENTION

This invention is a new and improved motor vehicle body including a plurality of vertical pillars between which are defined a plurality of door frames for access to a passenger compartment of the vehicle body, a plurality of doors supported by pairs of hinges on one of the vertical pillars of each door frame for pivotal movement between closed and open positions, and a light weight side impact protection barrier characterized by high elongational stiffness and high strain-at-failure. The light weight barrier may be employed alone or in combination with a horizontal door beam and includes a synthetic cable in the door made from a plurality of helically braided bundles of fiber strands selected from a group of fibers consisting of aramid fibers and liquid crystal polymer fibers. The synthetic cable includes front and rear attachments to the front and rear pillars of the door frame when the door is closed. The synthetic cable is very stiff in tension to suppress lateral intrusion into the passenger compartment and has a failure mode characterized by serial or sequential rupture of individual ones of the fibers in the plurality of helically braided bundles rather than simultaneous rupture characteristic of steel cables. In a first modified embodiment of the vehicle body according to this invention, the light weight barrier includes a plurality of synthetic cables in the door having different amounts of initial slack to expand the duration of side impact protection by staging the onset of tension in the synthetic cables. In a second modified embodiment of the vehicle body according to this invention, the light weight barrier includes a plurality of synthetic cables in the door arrayed in an "X" pattern to maximize the lateral exposure of the barrier. In a third modified embodiment of the vehicle body according to this invention, the light weight barrier includes a plurality of synthetic cables arrayed in the doors and laterally across the vehicle body to more broadly disperse impact forces throughout the vehicle body.

BRIEF DESCRIPTION OF THE DRAWINGS

FIG. 1 is a schematic elevational view of a motor vehicle body according to this invention;

FIG. 2 is a sectional view taken generally along the plane indicated by lines 2—2 in FIG. 1;

DESCRIPTION OF THE PREFERRED EMBODIMENT

Figure 3:
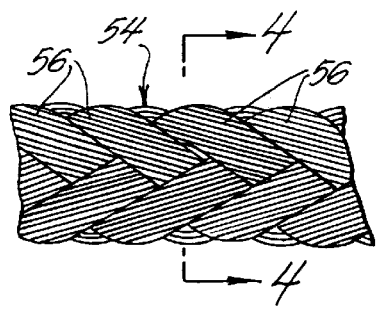
FIG. 3 is an enlarged view of the portion FIG. 1 identified by the reference circle 3 in FIG. 1.

Referring to FIGS. 1–2, a schematically represented motor vehicle body 10 according to this invention includes a front sheet metal portion 12, a rear sheet metal portion 14, a roof 16, and a floor 18 which cooperate in defining therebetween a passenger compartment 20 of the vehicle body. The vehicle body 10 further includes on opposite lateral sides thereof a first pair of vertical pillars 22 referred to as "A" pillars at the front of the passenger compartment, a second pair of vertical pillars 24 referred to as "B" pillars in the middle of the passenger compartment, and a third pair of vertical pillars 26 referred to as "C" pillars behind the passenger compartment. The A and B pillars 22,24 define vertical front and rear edges, respectively, of respective ones of a pair of front door frames 28 on opposite sides of the vehicle body for access to the passenger compartment. The B and C pillars 24,26 define vertical front and rear edges, respectively, of respective ones of a pair of rear door frames 30 on opposite sides of the vehicle body for access to the passenger compartment.

The vehicle body 10 further includes a pair of front doors 32 and a pair of rear doors 34. Each front door 32 includes a dish-shaped inner panel 36 and an outer panel 38 hem flanged to the inner panel and cooperating therewith in defining an inner chamber 40 of the door. Each rear door 34 includes a dish-shaped inner panel 42 and an outer panel 44 hem flanged to the inner panel and cooperating therewith in defining an inner chamber 46 of the door. Each of the front and the rear doors 32,34 further includes a schematically represented horizontal steel beam 48 in the corresponding inner chamber 40,46 of the door.

Figure 4:
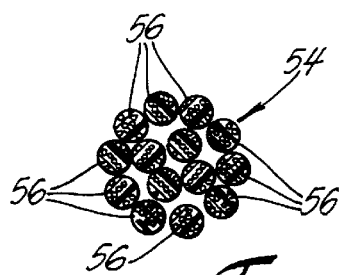
FIG. 4 is a sectional view taken generally along the plane indicated by lines 4—4 in FIG. 3.
Figure 5:
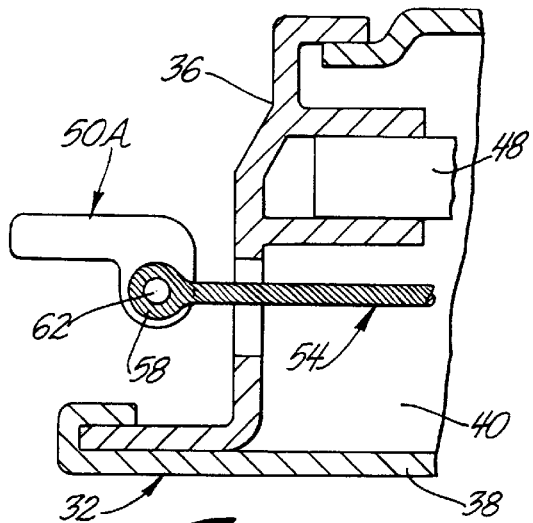
FIG. 5 is an enlarged view of the portion FIG. 2 identified by the reference circle 5 in FIG. 2.
Figure 6:
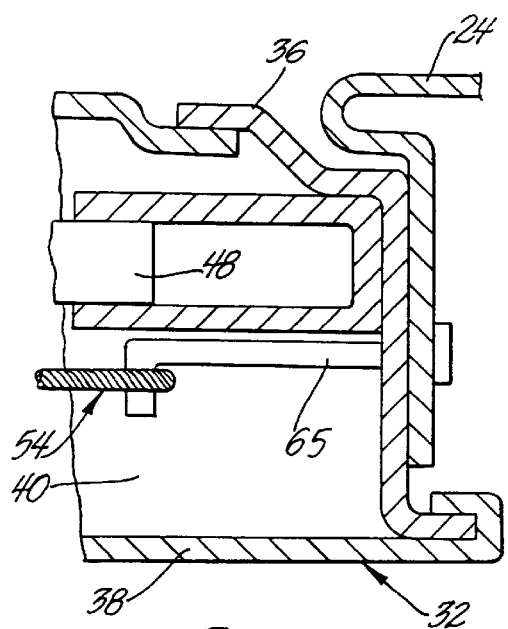
FIG. 6 is an enlarged view of the portion FIG. 2 identified by the reference circle 6 in FIG. 2.

Each front door 32 is supported by a pair of hinges 50A,50B on the corresponding A pillar 22 of the vehicle body for pivotal movement between a closed position, FIGS. 1–2, in the corresponding front door frame 28 and an open position, not shown, exposing the front door frame. Each rear door 34 is supported by a pair of hinges 52A,52B on the corresponding B pillar 24 of the vehicle body for pivotal movement between a closed position, FIGS. 1–2, in the corresponding rear door frame 30 and an open position, not shown, exposing the rear door frame. Conventional latches, not shown, on the doors cooperate with strikers, not shown, on the B and the C pillars 24,26 in releasably securing the front and the rears doors in their closed positions. In the closed positions of the front and rear doors, the horizontal beams 48 therein span corresponding ones of the front and rear door frames and define stiff side impact protection barriers against intrusion into the passenger compartment 20 of an object, e.g. another motor vehicle, which impacts the vehicle 10 body laterally As seen best in FIGS. 1–6, the vehicle body 10 further includes additional side impact protection barriers in the form of a plurality of identical synthetic cables 54 in the inner chambers 40,46 of each of the front and the rear doors 32,34. The synthetic cables 54 are made of filaments of a synthetic material exhibiting high elongational stiffness and high strain-at-failure selected from a group consisting of Kevlar 29® aramid fibers available from the Dupont Corporation and a high performance thermoplastic multi-filament yarn spun from Vectrae®, a liquid crystal polymer available from the Hoechst Celanese Corporation. Kevlar 29® and Vectrae® are materials having densities of about 1.4 g/cc and are light weight relative to steel having a density of about 7.7 g/cc. Kevlar 29® and Vectra® also exhibit high strain-at-failure, i.e. 3.6% and 3.3%, respectively, relative to the stain-at-failure for steel wire, i.e. 1.1%. In each synthetic cable 54, the filaments thereof are grouped in a plurality of multi-filament bundles 56, FIGS. 3–4, which bundles are helically braided. Synthetic cables which performed satisfactorily in experimental tests consisted of 12 multi-filament bundles, each bundle having a diameter of about 1.27 cm.

Each synthetic cable 54 terminates at a front loop 58 and at a rear loop 60. The front loop 58 of each of the synthetic cables in the front doors 32 is looped around a vertical pin 62, FIGS. 1 and 5, of the hinge 50A on the corresponding A pillar 22 so that the synthetic cables pivot with the front doors. The front loop 58 of each of the synthetic cables in the rear doors 34 is looped around a vertical pin 64, FIG. 1, of the hinge 52A on the corresponding B pillar 24 so that the synthetic cables pivot with the rear doors. The synthetic cables 54 are supported in the inner chambers 40 of the front doors such that the rear loop 60 of each hooks over an L-shaped anchor 65, FIG. 6, rigidly attached to the corresponding B pillar 24 in the closed position of the door. The synthetic cables 54 are supported in the inner chambers 46 of the rear doors such that the rear loop 60 of each hooks over an L-shaped anchor 66, FIG. 1, rigidly attached to the corresponding C pillar 26 in the closed position of the door. The L-shaped anchors 65,66 access the inner chambers of the front and the rear doors through slots, not shown, in the inner panels 36,42 thereof as the doors pivot between their open and closed positions. It is within the scope of this invention to support the front and rear doors on the vertical pillars defining the rear edges of the door frames for pivotal movement between open and closed positions and to reverse the locations of the hinges and the L-shaped anchors accordingly.

In the closed positions of the front and rear doors 32,34, the synthetic cables 54 therein span corresponding ones of the front and the rear door frames 28,30 and define barriers which supplement the side impact protection afforded by the steel beams 48 in the front and the rear doors. In operation, a lateral impact on the vehicle body 10 represented by a pair of schematic force vectors "$F_1$" and "$F_2$" first induces inward flexure of the outer panels 38,44 of the doors on the side of the vehicle body facing the impact. Because the synthetic cables, being flexible, have essentially zero stiffness in bending, the side impact is initially reacted to the vehicle body through the horizontal beams 48 which generate significant resistance with only small lateral deflection attributable to beam bending.

The lateral deflection in beam bending of the horizontal beams is accompanied by elimination of any initial slack in the synthetic cables 54 and tensioning thereof across the front door frame 28 between the A and B pillars 22,24 and across the rear door frame 30 between the B and C pillars 24,26. Then, the synthetic cables 54 become extremely stiff in tension and transfer the impact forces $F_1$ and $F_2$ to the A,B, and C pillars which impact forces accelerate the vehicle body away from the impact and thereby suppress penetration into the passenger compartment 20 of the object impacting the vehicle body. While the synthetic cables 54 in the doors 32,34 thus supplement the side impact protection afforded by the horizontal beams 48, it is within the scope of this invention to eliminate the horizontal beams. In such applications, any initial slack in the synthetic cables may be eliminated by preloading the synthetic cables in tension or may be compensated for by locating the synthetic cables further outboard on the doors, e.g. embedded in an exterior molding strip on the door.

Importantly, the effective high strain-at-failure capability of the synthetic cables 54 of about 13%, attributable to about 3% elongation of the individual synthetic fibers and about 10% elongation attributable to the helical braid of the bundles 56, permits each synthetic cable to elongate inelastically without failure while resisting penetration into the passenger compartment in accordance with pertinent, legislatively mandated standards. An additional important performance characteristic of the synthetic cables 54 is that they do not fail abruptly in tension as does a steel cable. Rather, individual ones of the fibers in respective ones of the braided bundles 56 rupture serially or sequentially so that while some of the braided bundles may fail in tension, others remain intact and capable of sustaining considerable tensile forces to continue to suppress lateral penetration into the passenger compartment.

Figure 7:
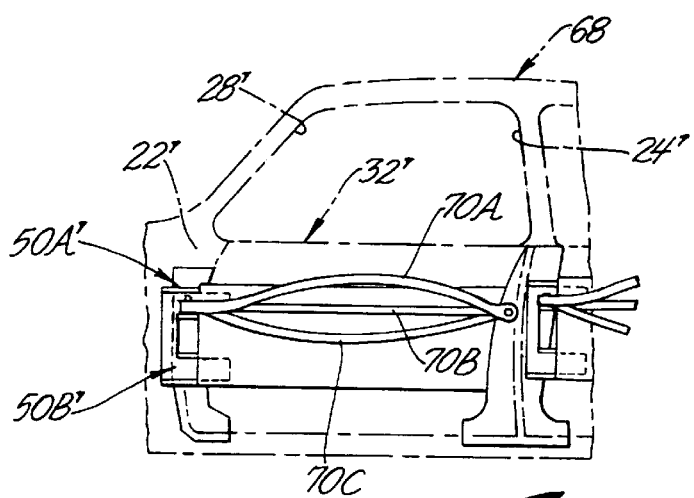
FIG. 7 is a fragmentary broken-away elevational view of a modified embodiment of the motor vehicle body according to this invention.

A first modified motor vehicle body 68 according to this invention is fragmentarily illustrated in FIG. 7. Structural elements common to both the vehicle body 10 described above and to the modified vehicle body 68 are identified by primed reference characters in FIG. 7. The modified vehicle body 68 includes a front door frame 28' between an A pillar 22' and a B pillar 24' of the vehicle body. A door 32' is supported on the A pillar 22' by a pair of hinges 50A',50B' for pivotal movement between a closed position, FIG. 7, and an open position, not shown.

A plurality of synthetic cables 70A,70B,70C in an inner chamber of the door 32' are made of the same synthetic fibers as the cables 54 described above and are structurally the same. Each of the cables 70A,70B,70C has a front loop around a vertical pin of the hinge 50A' and a rear loop hooked over an anchor on the B pillar 24' when the door is in its closed position. The lengths of the synthetic cables 70A,70B,70C are different from each other so that each cable has a different amount of initial slack between the A and B pillars when the door 32' is closed. The synthetic cables 70A,70B,70C afford side impact protection as described above but with the additional advantage that the differing amounts of initial slack in the synthetic cables increase the duration of side impact protection by delaying the onset of tension in the longer of the synthetic cables until the slack is eliminated in the shorter of the synthetic cables.

Figure 8:
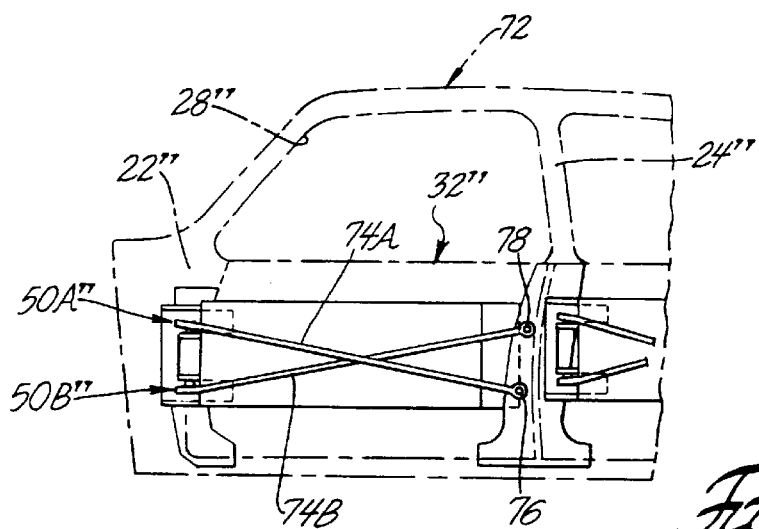
FIG. 8 is a fragmentary broken-away elevational view of a second modified embodiment of the motor vehicle body according to this invention.

A second modified motor vehicle body 72 according to this invention is fragmentarily illustrated in FIG. 8. Structural elements common to both the vehicle body 10 described above and to the second modified vehicle body 72 are identified by double primed reference characters in FIG. 8. The second modified vehicle body 72 includes a front door frame 28" between an A pillar 22" and a B pillar 24" of the vehicle body. A door 32" is supported on the A pillar 22" by a pair of hinges 50A",50B" for pivotal movement between a closed position, FIG. 8, and an open position, not shown.

A pair of synthetic cables 74A,74B in an inner chamber of the door 32" are made of the same synthetic fibers as the cables 54 described above and are structurally the same. The cable 74A has a front loop around a vertical pin of the upper hinge 50A" and a rear loop hooked over a first anchor 76 on the B pillar 24" when the door is in its closed position at a lower elevation on the vehicle body than the upper hinge 50A". The cable 74B has a front loop around a vertical pin of the lower hinge 50B" and a rear loop hooked over a second anchor 78 on the B pillar 24" when the door is in its closed position at a higher elevation on the vehicle body than the lower hinge 50B". The synthetic cables 74A,74B define an X pattern in the door to maximize their exposure to side impacts and function as described above to suppress intrusion into a passenger compartment of the second modified vehicle body 72.

Figure 9:
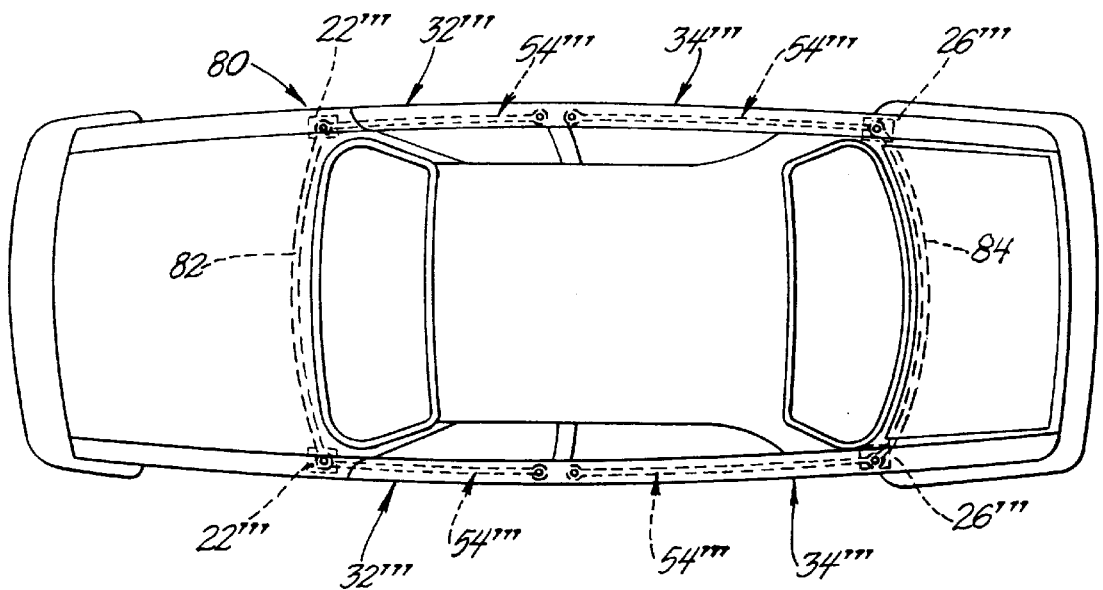
FIG. 9 is a schematic plan view of a third modified embodiment of the motor vehicle body according to this invention.

A third modified motor vehicle body 80 according to this invention is fragmentarily illustrated in FIG. 9. Structural elements common to both the vehicle body 10 and to the third modified vehicle body 80 are identified by triple primed reference characters in FIG. 9. The third modified vehicle body 80 includes a pair of front doors 32'" and a pair of rear doors 34'" on opposite sides thereof in respective ones of a pair front door frames and a pair rear door frames. Each of the front and rear doors has a longitudinal synthetic cable 54'" therein spanning the corresponding door frame in a closed position of the door and defining a side impact protection barrier on the third modified vehicle body as described above.

The third modified vehicle body 80 further includes a schematically represented front lateral synthetic cable 82 and a schematically represented rear lateral synthetic cable 84. The front and rear lateral synthetic cables 82,84 are made of the same synthetic fibers as the cables 54 described above and are structurally the same except for their lengths. The front lateral synthetic cable 82 is attached at opposite ends to respective ones of a pair of A pillars 22'" of the third modified vehicle body. The rear lateral synthetic cable 84 is attached at opposite ends to respective ones of a pair of C pillars 26'" of the third modified vehicle body. The lateral synthetic cables transfer impact forces from the lateral side of the third modified vehicle body facing the impact to the opposite lateral side thereof and thereby more broadly diffuse the impact forces throughout the third modified vehicle body to minimize the magnitudes of the forces reacted to individual structural elements of the third modified vehicle body.

Having thus described the invention, what is claimed is:

1. A motor vehicle body comprising:
    a vertical front pillar and a vertical rear pillar defining therebetween a door frame in a side of the vehicle body for access to a passenger compartment of the vehicle body,
    a door supported on a first one of the vertical front pillar and the rear vertical pillar for pivotal movement between a closed position in the door frame and an open position exposing the door frame,
    a synthetic cable made from a plurality of helically braided bundles of fibers selected from a group consisting of aramid fibers and liquid crystal polymer fibers characterized by strain-at-failure exceeding about 3%,
    a first attachment means operative to attach a first end of the synthetic cable to the first one of the vertical front pillar and the vertical rear pillar for pivotal movement as a unit with the door, and
    a second attachment means operative to attach a second end of the synthetic cable to a second one of the vertical front pillar and the vertical rear pillar in the closed position of the door with a predetermined amount of slack in the synthetic cable between the vertical front and the vertical rear pillars so that the synthetic cable defines a side impact protection barrier on the vehicle body for suppressing intrusion into the passenger compartment by an object laterally impacting the vehicle body.

2. The motor vehicle body recited in claim 1 further comprising:
    a rigid horizontal beam in the door spanning the door frame in the closed position of the door and defining a second side impact protection barrier on the vehicle body for suppressing intrusion into the passenger compartment by the object laterally impacting the vehicle body.

3. The motor vehicle body recited in claim 1 further comprising:
    a second synthetic cable made from a plurality of helically braided bundles of fibers selected from a group consisting of aramid fibers and liquid crystal polymer fibers characterized by strain-at-failure exceeding about 3%,
    a first attachment means operative to attach a first end of the second synthetic cable to the first pillar one of the vertical front pillar and the vertical rear pillar for pivotal movement as a unit with the door, and
    a second attachment means operative to attach a second pillar end of the second synthetic cable to the second one of the vertical front pillar and the vertical rear pillar in the closed position of the door with a predetermined amount of slack in the second synthetic cable between the vertical front and the vertical rear pillars different from the predetermined amount of slack in the first synthetic cable between the vertical front and the vertical rear pillars so that the first and the second synthetic cables cooperate in defining a side impact protection barrier on the vehicle body having a duration of suppression of intrusion into the passenger compartment by the object laterally impacting the vehicle body exceeding the duration of suppression of intrusion afforded by the first synthetic cable alone.

4. The motor vehicle body recited in claim 3 further comprising:
    a rigid horizontal beam in the door spanning the door frame in the closed position of the door and defining a second side impact protection barrier on the vehicle body for suppressing intrusion into the passenger compartment by the object laterally impacting the vehicle body.

5. A motor vehicle body comprising:
- a vertical front pillar and a vertical rear pillar defining therebetween a door frame in a side of the vehicle body for access to a passenger compartment of the vehicle body,
- a door supported on a first one of the vertical front pillar and the vertical rear pillar for pivotal movement between a closed position in the door frame and an open position exposing the door frame,
- a first synthetic cable made from a plurality of helically braided bundles of fibers selected from a group consisting of aramid fibers and liquid crystal polymer fibers characterized by strain-at-failure exceeding about 3%,
- a first attachment means operative to attach a first end of the first synthetic cable to the first one of the vertical front pillar and the vertical rear pillar for pivotal movement as a unit with the door,
- a second attachment means operative to attach a second end of the first synthetic cable to a second one the vertical front pillar and the vertical rear pillar in the closed position of the door at an elevation on the vehicle body lower than the elevation of the first attachment means,
- a second synthetic cable made from a plurality of helically braided bundles of fibers selected from a group consisting of aramid fibers and liquid crystal polymer fibers characterized by strain-at-failure exceeding about 3%,
- a third attachment means operative to attach a first end of the second synthetic cable to the first one of the vertical front pillar and the vertical rear pillar for pivotal movement as a unit with the door at an elevation on the vehicle body lower than the first attachment means, and
- a fourth rear attachment means operative to attach a second end of the second synthetic cable to the second one of the vertical front pillar and the vertical rear pillar in the closed position of the door at an elevation on the vehicle body higher than the elevation of the second attachment means so that the first and the second synthetic cables span the door frame in the closed position of the door in an "X" pattern and cooperate in defining a side impact protection barrier on the vehicle body for suppressing intrusion into the passenger compartment by an object laterally impacting the vehicle body.

6. The motor vehicle body recited in claim 5 further comprising:
- a rigid horizontal beam in the door spanning the door frame in the closed position of the door and defining a second side impact protection barrier on the vehicle body for suppressing intrusion into the passenger compartment by the object laterally impacting the vehicle body.

7. A motor vehicle body comprising:
- a pair of vertical front pillars and a pair of vertical rear pillars defining therebetween a pair of door frames on opposite sides of the vehicle body for access to a passenger compartment of the vehicle body,
- a pair of doors supported on respective ones of the pair of vertical front pillars for pivotal movement between a closed position in the corresponding door frame and an open position exposing the corresponding door frame,
- a pair of longitudinal synthetic cables made from a plurality of helically braided bundles of fibers selected from a group consisting of aramid fibers and liquid crystal polymer fibers characterized by strain-at-failure exceeding about 3%,
- a first attachment means operative to attach a first end of each of the pair of longitudinal synthetic cables to respective ones of the pair of vertical front pillars for pivotal movement as a unit with the corresponding one of the pair of doors,
- a second attachment means operative to attach a second end of each of the pair of longitudinal synthetic cables to respective ones of the vertical rear pillars in the closed position of the corresponding one of the pair of doors so that the pair of longitudinal synthetic cables define side impact protection barriers on the vehicle body for suppressing intrusion into the passenger compartment by an object laterally impacting a corresponding side the vehicle body,
- a pair of lateral synthetic cables made from a plurality of helically braided bundles of fibers selected from a group consisting of aramid fibers and liquid crystal polymer fibers characterized by strain-at-failure exceeding about 3%,
- a third attachment means operative to attach opposite ends of a first one of the pair of lateral synthetic cables to respective ones of the pair of vertical front pillars, and
- a fourth attachment means operative to attach opposite ends of a second one of the pair of lateral synthetic cables to respective ones of the vertical rear pillars so that the pair of lateral synthetic cables cooperate in dispersing throughout the vehicle body forces attributable to the impact of the object on a side of the vehicle body.

* * * * *